United States Patent
Clavette et al.

(10) Patent No.: US 9,404,172 B2
(45) Date of Patent: Aug. 2, 2016

(54) EROSION AND FATIGUE RESISTANT BLADE AND BLADE COATING

(71) Applicants: Patrick Louis Clavette, Simsbury, CT (US); Jun Shi, Carmel, IN (US); Aaron T. Nardi, East Granby, CT (US)

(72) Inventors: Patrick Louis Clavette, Simsbury, CT (US); Jun Shi, Carmel, IN (US); Aaron T. Nardi, East Granby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 865 days.

(21) Appl. No.: 13/633,597

(22) Filed: Oct. 2, 2012

(65) Prior Publication Data
US 2014/0093378 A1    Apr. 3, 2014

Related U.S. Application Data

(60) Provisional application No. 61/601,828, filed on Feb. 22, 2012.

(51) Int. Cl.
| | |
|---|---|
| *F01D 5/28* | (2006.01) |
| *C23C 4/06* | (2016.01) |
| *B64C 11/20* | (2006.01) |
| *C23C 30/00* | (2006.01) |
| *C23C 24/04* | (2006.01) |

(52) U.S. Cl.
CPC .............. *C23C 4/06* (2013.01); *B64C 11/205* (2013.01); *C23C 4/129* (2016.01); *C23C 24/04* (2013.01); *C23C 30/00* (2013.01); *F01D 5/288* (2013.01); *F05D 2240/303* (2013.01); *Y02T 50/672* (2013.01)

(58) Field of Classification Search
CPC ........ C23C 4/06; C23C 24/04; B64C 11/205; F01D 5/288
See application file for complete search history.

(56) References Cited

U.S. PATENT DOCUMENTS

| | | | |
|---|---|---|---|
| 3,825,371 A | * | 7/1974 | Roder ............... B64C 27/473 244/134 D |
| 4,163,071 A | | 7/1979 | Weatherly et al. |
| 4,428,213 A | | 1/1984 | Neal et al. |
| 4,904,528 A | * | 2/1990 | Gupta et al. .................. 428/336 |
| 5,306,120 A | * | 4/1994 | Hammer et al. ............... 416/224 |
| H1869 H | | 10/2000 | Beardsley et al. |
| 6,740,624 B1 | | 5/2004 | Hoste et al. |
| 6,815,099 B1 | | 11/2004 | Zajchowski et al. |
| 7,431,566 B2 | | 10/2008 | Gray et al. |
| 7,435,056 B2 | | 10/2008 | Liston |

(Continued)

FOREIGN PATENT DOCUMENTS

| | | |
|---|---|---|
| EP | 0323388 A2 | 7/1989 |
| EP | 1852520 A1 | 11/2007 |
| EP | 2226409 A2 | 9/2010 |

OTHER PUBLICATIONS

Detonation Gun System, Feb. 18, 2010, http://aflame.homestead.com/detonation-gun-system.html, p. 2.*

(Continued)

*Primary Examiner* — Richard Edgar
*Assistant Examiner* — Jeffrey A Brownson
(74) *Attorney, Agent, or Firm* — Cantor Colburn LLP

(57) ABSTRACT

A coating is described for an airfoil blade component. The coating comprises a cermet material and has, when applied to the rotor blade, a compressive residual stress greater than about 60 ksi. In another embodiment, the compressive residual stress of the coating is in the range of approximately 90-110 ksi.

7 Claims, 1 Drawing Sheet

(56) References Cited

U.S. PATENT DOCUMENTS

| | | | |
|---|---|---|---|
| 7,887,288 | B2 | 2/2011 | David |
| 2008/0072790 | A1 | 3/2008 | Ma et al. |
| 2008/0087359 | A1 | 4/2008 | Zurecki et al. |
| 2009/0148303 | A1* | 6/2009 | Leahy .............. B64C 27/463 416/226 |
| 2010/0119375 | A1 | 5/2010 | Rutz et al. |
| 2010/0226783 | A1* | 9/2010 | Lipkin et al. .............. 416/241 B |
| 2010/0304107 | A1 | 12/2010 | Nardi et al. |

OTHER PUBLICATIONS

EP Search Report for European Patent Application No. 12198621.0-1362 dated May 17, 2013.

"Replacement of Chromium Electroplating on Helicopter Dynamic Components Using HVOF Thermal Spray Technology", ESTCP Cost and Performance Report (WP-0127), Nov. 2009, XP055062013, ESTCP Program Office, Arlington, VA, Retrieved from the Internet: URL: http://www.dtic.mil/cgi-bin/GetTRDoc?Location=U2&doc=GetTRDoc.pdf&AD=ADA520680 [retrieved on May 6, 2013].

Guagliano, M., "Relating Almen intensity to residual stresses induced by shot peening: a numerical approach", Journal of Materials Processing Technology, vol. 110, No. 3, Apr. 2, 2001, pp. 277-286, XP055062040, Elsivier B. V., NL ISSN: 0924-0136, DOI: 10.1016/S0924-0136(00)00893-1.

Nonga, C. Omarn, et al., "Study of Residual Stress Produced In Metal Matrix Composite AlSiCw by Shot Peening.", The Fifth International Conference on Shot Peening, Sep. 13-17, 1993, Oxford, GB, Sep. 13, 1993, pp. 291-300, XP055062068, Coventry University, Coventry, GB.

Wiegren, Jan; Pejryd, Lars; Aero, Volvo, Tungsten Carbide Coatings on Jet Engine Components: Safe Aviation; Sulzer Technical Review; Feb. 2000; pp. 36-39.

\* cited by examiner

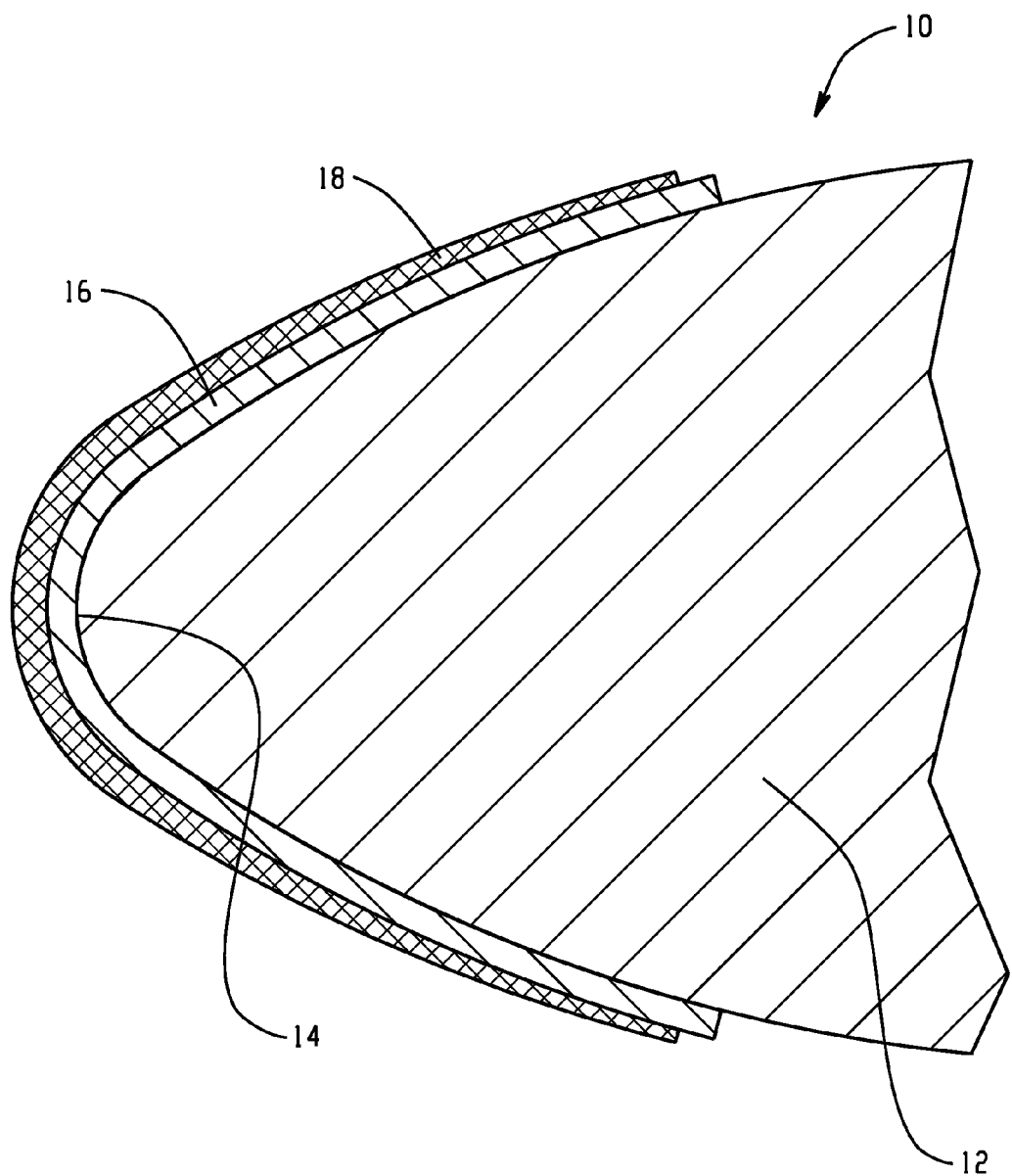

EROSION AND FATIGUE RESISTANT BLADE AND BLADE COATING

This application claims priority to U.S. provisional patent application No. 61/601,828 filed on Feb. 22, 2012, the disclosure of which is incorporated herein by reference in its entirety.

The invention described herein was made with Government support under Agreement No. W911W6-08-2-0006 for Rotor Durability Army Technology Objective (ATO). The Government has certain rights in the invention.

BACKGROUND OF THE INVENTION

The leading edges of airfoil blades such as helicopter main and tail rotor blades are subject to erosion from contact with airborne matter such as rain or sand. In desert environments, sand erosion is often experienced on airfoil blades. The blade leading edge is typically protected by a metallic erosion strip consisting of nickel (Ni) over titanium (Ti) on the outboard portion of the blade and titanium on the inboard portion. Exemplary Ti-based substrate alloys include Ti-6Al-4V, Ti-8Al-1Mo-1V, Ti-6Al-2Sn-4Mo-2Zr, Ti-6Al-2Sn-4Mo-6Zr, and Ti-5.5Al-3.5Sn-3Zr-1Nb. Other substrates include, but are not limited to, stainless steels (e.g., 17-4PH) and Ni-base superalloys (e.g., alloy 718).

Sand, which is primarily made up of quartz, is significantly harder than both Ni and Ti. This hardness difference results in significant degradation of rotor blades in desert environments. As a result, this has become one of the largest logistics and maintenance burdens for helicopter operators in a sandy environment. Another significant problem is that a corona or halo, which is visible through night vision goggles, is generated around the rotor blades at night due to sand particles impacting the Ti leading edge. The erosion phenomenon has been widely studied, for example, by S. M. Wiederhorn, B. J. Hockey, Effect of material parameters on the erosion resistance of brittle materials, J. Mater. Sci. 18 (1983) 766-780; I. M. Hutchings, R. E. Winter, Particle erosion of ductile metals: a mechanism of material removal, Wear 27 (1974) 121-128; L. Zhao, M. Maurer, F. Fischer, E. Lugscheider, Surf. Coat. Technol. 185, (2004) 160-165; I. Finnie, Erosion of surfaces by solid particles, Wear 3 (1960) 87-103; J. G. A. Bitter, A study of erosion phenomena. Part I &2 Wear 6 (1963) 5-21 and 169-190; and I. M. Hutchings, Ductile-brittle transitions and wear maps for the erosion and abrasion of brittle materials, J. Phys. D: Appl. Phys. 25 (1992), A212-A221.

Typical metal erosion strips generally cover approximately one inch of the blade surface measured from the leading edge. The most severe wear in sand erosion patterns on, for example, a UH-60L main rotor blade, is generally at the tip cap and covers nearly 50% of the tip cap surface. Leading edge wear ranges from 6.0" to 0.5" in width measured from the end of erosion strip. The erosion takes place on the top and bottom surfaces of the blade as well as at the leading edge. The tail rotor blade erodes primarily at the tips with approximately one-half the length of the blade along the leading edge affected.

Recently, soft polymeric coatings in tape and sprayed forms have been applied onto blade leading edges to control sand erosion. These coatings provide improved service life when compared to uncoated substrates but require frequent repair and replacement. One polymeric coating evaluated in a test program has demonstrated a significant 4-5 times improvement of sand erosion resistance. However, polymeric coatings generally exhibit poor erosion performance in a rain environment due to their low strength and the high dynamic stress generated by the impacting raindrop. Erosion life of the polymer coating can be further reduced in extreme temperature and high humidity environments. The degradation from rain erosion is much faster if the rotor blade leading edge has been eroded by sand and small rock particles first, which causes surface defects that grow under the dynamic stress from the flow of raindrops upon impact.

In view of the above, there is a need to develop alternative erosion protection coatings.

BRIEF DESCRIPTION OF THE INVENTION

According to an embodiment, a coating is provided for an airfoil blade component. The coating comprises a cermet material and has, when applied to an airfoil member such as a rotor blade, a compressive residual stress greater than about 60 ksi. In another exemplary embodiment, the compressive residual stress of the coating is in the range of approximately 90-110 ksi.

According to another embodiment, a method is provided for coating a metallic rotor blade component. According to this method, a cermet material is deposited to the component using a thermal spray such that the applied coating material has a compressive residual stress greater than about 60 ksi. In another exemplary embodiment, the component is maintained at a temperature below 200° F. while depositing the cermet material. In yet another embodiment, the depositing step is performed such that the compressive residual stress of the applied material is in the range of about 90 ksi to about 110 ksi.

According to yet another embodiment, an airfoil blade includes a component having a leading edge metallic erosion strip and a cermet coating on a surface of the strip. The coating has a compressive residual stress greater than about 60 ksi. In a more specific exemplary embodiment, the compressive residual stress is in the range of about 90 to about 110 ksi.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying FIGURE, in which:

The FIGURE is a schematic view of a portion of an exemplary airfoil blade as described herein.

DETAILED DESCRIPTION OF THE INVENTION

An airfoil blade with which the coatings described herein can be used includes any of a number of known types such as helicopter rotor blades, aircraft propeller blades, turbine engine fan and compressor blades, wind turbines, and various types of fan blades. In an exemplary embodiment, the airfoil blade is a helicopter rotor blade.

A surface of the airfoil blade such as a leading edge or surface adjacent to a leading edge is coated with a cermet coating. As is well-known in the art, a cermet material is a composite material of ceramic and metal. Virtually any of the known ceramics and metals that can be used in a cermet material that can be used for the embodiments described herein. Among the useful ceramics include carbides (e.g., tungsten carbide, chrome carbide, titanium carbide, silicon carbide), nitrides (e.g., silicon nitride, boron nitride, titanium nitride, silicon aluminium oxynitride, titanium carbonitride), as well as other ceramics such as oxides and borides. In a more specific embodiment, the ceramic is a carbide and/or a nitride, and in an even more specific embodiment, the ceramic is a carbide. Among the useful metals include cobalt, nickel, molybdenum, chromium (e.g., Ni—Cr alloy). In a more specific embodiment, the metal is cobalt and/or nickel and/or chrome, and in a more specific embodiment, the metal is cobalt. Exemplary types of cermet materials include but are not limited to tungsten-carbide-cobalt (WC—Co), tungsten-carbide-nickel (WC—Ni), tungsten-carbide-cobalt-chrome (WC—Co—Cr), chrome-carbide-nickel-chrome (CrC—Ni—Cr), and chrome-carbide-nickel (CrC—Ni). Varying ratios of ceramic to metal can also be used, as is known in the art. In exemplary embodiments, the weight ratio of ceramic to metal can range from 92:8 to 50:50. Exemplary specific cermet materials include, but are not limited to, WC-12Co, WC-10Co-4Cr, 75CrC-25NiCr, 90CrC-10NiCr, and WC-17Co. Crystallite size can vary widely depending on the specific material. For example, crystallite size for tungsten carbide cobalt cermets can range from sub-micron (e.g., about 200 nm) to about 5 μm.

The coating may be applied by any of a number of thermal spray techniques, which are well-known in the art. In an exemplary embodiment, the thermal spray technique is high velocity oxy-fuel (HVOF), which is a spray technique where a fuel such as hydrogen, acetylene, propane, propylene, or the like is combusted with oxygen, and the combustion gases are expanded through a nozzle at high velocity toward a target object. A feedstock of the cermet material is introduced into the high-velocity gas stream where it is fluidized and propelled toward the target. Other thermal spray techniques include high velocity air fuel (HVAF), detonation spray coating (DSC), cold spray, plasma spray, flame spray (e.g., powder flame spray), and electric arc spray (e.g., twin wire arc spray) and others known in the art. HVAF operates similarly to HVOF, except that air is used as a combustant instead of oxygen. With DSC, oxygen and fuel are fed into a combustion chamber along with a charge of cermet powder feedstock, and ignited, with the resulting combustion gases and cermet being expelled from a barrel or discharge apparatus at high velocity towards a target surface. This process is repeated many times a second to project a series of cermet-charged pulses onto the coating substrate. In a cold spray process, unmelted cermet particles are introduced into a high velocity gas stream being projected out of a high velocity (e.g., supersonic) nozzle toward a coating substrate target. The particles' kinetic energy provides sufficient heat on impact with the coating substrate such that the particles plastically deform and fuse with the substrate and surrounding deposited cermet material. With plasma spray, a plasma-forming gas (e.g., argon, nitrogen, hydrogen, and/or helium) is converted into a plasma stream and expelled from a nozzle at supersonic or subsonic speeds directed toward a coating substrate target, with cermet powder feedstock being introduced into the plasma stream.

During thermal and cold spray processes, the leading edge region of the blade is exposed to high temperature and high velocity impact that lead to residual stresses in the coating. The process and process parameters should be selected in order to impart high compressive residual stress (greater than about 60 ksi) into the coating, more specifically from about 90 ksi to about 110 ksi.

In HVOF, HVAF, or DSC processes, semi-molten plasticized material exits the gun at between Mach 1 and Mach 3, and impacts the target substrate. In a cold spray process, solid particles exit the gun also up to supersonic speeds, and impact the target substrate. In plasma spray processes, the process operates similarly, but at either sonic or subsonic velocities.

As the particles impact the substrate, they rapidly cool even as the particles are deforming. The particles change shape dramatically from relatively round to very thin flat splats on the surface. This plastic deformation process imparts a compressive residual stress. Higher particle velocities with the same initial particle temperature produce higher compressive residual stress. In fact, newer cold spray processes, in which the primary temperature rise is due to particle impact deformation, can achieve very high compressive residual stress (e.g., up to 80 ksi or more) and have very high strain threshold to cracking.

The residual stress state of a coating bonded to a substrate will play a significant role in the strain it takes to crack the coating. If a coating could be produced without being bonded to a substrate, but with a quality consistent with a properly produced coating, the coating would effectively have no residual stress. Such a hypothetical coating would give the true strain threshold or ultimate strength of the coating material. When that same coating is bonded to a substrate with residual compressive stress, the amount of tensile strain that the coating can take before cracking is a result of the capability of the coating alone plus the residual compressive stress. The residual stress is a combination of mechanical stresses due to severe deformation of solid, semi-molten, and molten material that is generated during the spraying process, the peening effect of subsequent layers onto prior layers, and the coefficient of thermal expansion (CTE) differential between the coating and the substrate as the system cools following coating application.

The residual stress is controlled by varying gun type and barrel design, fuel and oxidizer feed rate, powder feed rate, part/gun traverse rate, spray standoff distance, and to a lesser extent auxiliary cooling and interpass hold interval during spray application. As is understood in the art of coating application, a number of different combinations of these parameters can be used to achieve a desired residual stress. The substrate temperature on the other hand is also affected by the same variables, but not necessarily in the same order of importance. However, many of these variables affect both compressive stress and substrate temperature in a complimentary way.

In the various thermal spray processes, the substrate temperature usually becomes elevated above room temperature due to heat from the thermal spray exhaust gases, heat from the cermet particles, and/or kinetic energy from the impact of the cermet particles with the substrate. Although controls may be in place to keep substrate temperatures below certain limits based on alloy family, part temperatures can exceed 300° F. Therefore once plastic deformation of the particles impacting the substrate has taken place and both coating and substrate reach an equilibrium temperature, they are then typically cooled to room temperature. Due to the CTE differentials between cermet coatings like WC—Co and many typical substrate materials, the cooling process causes the coating to be subjected to further compression. For example, the CTE of a nominal WC-17Co coating is about 4.5e-6 in/in/° F. Substrate materials can typically range anywhere from 5.5e-6 in/in/° F. to 13e-6 in/in/° F. This thermal contraction can therefore be a significant factor in the residual stress of a coating.

Residual stress can be determined by techniques known in the art. An exemplary technique for the determination of residual stress is the use of Almen witness strips. Almen strips are commonly used as witness coupons to measure the residual stress introduced by peening processes, but when applied to thermal spray evaluation, can provide valuable information of the residual stress state of the coated material.

The procedure consists of measuring the arc height of an Almen strip prior to coating. An Almen gage may be used to generate the measurement. The strip is then coated using the same process parameters to be used for the actual coating on the part. The arc height after spraying is measured and the change in arc height is then correlated to the residual stress in the material using beam theory.

In an exemplary embodiment, a thermal spray process is used to deposit a cermet coating material onto a leading edge of a finished blade or component on a leading edge of a finished blade through control of spray parameters and auxiliary cooling to maintain the substrate temperature below 200° F. Maintenance of such a temperature during spray application can avoid undesired thermally-induced stress on the blade or blade component(s) as well as avoiding thermal damage to certain underlying blade components or materials such as adhesives or resistive heater mats used for de-icing.

In an exemplary embodiment, a cermet coating is applied to the leading edge of a blade component such as a thin sheet of metal adhered to a polymer matrix composite material. The blade component can also be a metal erosion-resistant strip disposed along the leading edge of an airfoil blade, which itself can be a solid metal blade or a composite blade covered by a metal sheath, or the blade component can be a simple monolithic airfoil blade formed from conventional materials such as steel or other metals, polymers, etc. Conventional spray parameters (e.g., temperature, velocity, feed and combustion rates, spray aiming pattern, standoff distance) can be adjusted to result in the desired residual compressive stress in the deposited coating. Controlling the level of residual stress can contribute to optimizing part life, while minimizing excessive stress that might have detrimental effects on the substrate. These effects may include susceptibility to subsurface initiated fatigue or delamination of substrate sheath materials from the blade structure by failure of the adhesive bond. The residual compressive stress allows the blade to meet the required fatigue life in a highly stressed application. Accordingly, in an exemplary embodiment, the cermet coating of at least about 60 ksi is disposed on the leading edge of an airfoil blade in areas that are particularly subject to fatigue. High fatigue areas of an airfoil blade can vary depending on the particular blade design. In an exemplary embodiment where the airfoil blade is helicopter rotor blade, portions of the blade closer to the axis of rotation or shaft can experience higher fatigue than portions of the blade farther away from the axis of rotation or shaft. In one such exemplary embodiment, a cermet coating on a portion of the rotor blade closer to the axis of rotation or shaft has a residual stress of at least 60 ksi, more specifically from 90-110 ksi, and a cermet coating on a portion of the rotor blade farther from the axis of rotation or shaft has a residual stress less than 60 ksi, or alternatively less than 90 ksi. In another exemplary embodiment, a cermet coating on a portion of the rotor blade closer to the axis of rotation or shaft has a residual stress of at least 60 ksi, more specifically from 90-110 ksi, and a portion of the rotor blade farther from the axis of rotation or shaft does not have a cermet coating. In another exemplary embodiment, the cermet coating of at least about 60 ksi is disposed on substantially the entire leading edge of an airfoil blade such as a helicopter rotor blade.

An exemplary embodiment of an airfoil blade coated with a cermet coating as described herein is depicted in the FIGURE. As shown in the FIGURE, a portion of an airfoil blade assembly 10 is depicted in a cross-sectional schematic view (not necessarily to scale). Blade body 12, which may be a polymer matrix composite assembly covered by a metal sheath has a leading edge 14 covered by a metal erosion-resistant strip 16 such as a nickel or titanium strip. Cermet coating 18 is disposed over the metal erosion-resistant strip 16, and may be applied by any of the thermal spray techniques as described above, such as HVOF. Coating thickness can range from about 25 μm to about 750 μm.

The invention is further described in the following non-limiting examples.

EXAMPLES

In the examples, sub-micron to 2-micron carbide WC-12Co coatings were applied with HVOF spray techniques to achieve erosion performance, and an acceptable static strain threshold was achieved. This coating has been applied to Ti-6Al-4V and fatigue tested with acceptable results.

The deposition parameters are controlled to achieve an Almen N arc height of 0.017"-0.021" for a coating of 0.005" thickness, which is equivalent to a residual compressive stress in the range of approximately 90-110 ksi. Without this stress, such a coating is subject to cracking in the range of approximately 2000-3000 microstrain, however with this stress the coating can sustain between 5000 and 6000 microstrain without failure. It was found that when the HVOF coating is sprayed on a steel substrate using the chosen applied HVOF techniques, a compressive stress up to 100 ksi was developed within the coating.

Standard process optimization for the HVOF thermal spraying of the WC-12Co coating onto blade materials was performed using laminates of polymer matrix composite and titanium sheets to simulate the actual part to be coated. Fatigue bars of titanium were also coated using the same process parameters to allow for a direct determination of the fatigue strength of the system by fatigue testing. Static strain testing was performed using a four-point bend fatigue testing protocol developed for predicting successful performance in the field, and the results exceeded the design requirement. Witness coupons sprayed concurrently resulted in an Almen N arc height of 6 mils, for a coating thickness of 5.5 mils. This corresponds to an average through thickness residual stress of 100e+03 psi compressive in the coating, based on a coating modulus of 30e+06 psi for WC-12Co.

The sand erosion performance of the HVOF WC-12Co coating was evaluated in a linear erosion rig where 20/30 Ottawa sand was accelerated to 825 feet per second and allowed to impinge upon coupons of the coated material at angles of incidence of 30 degrees and 90 degrees. The cermet-coated coupons were compared against coupons coated with the following commonly used leading edge protection materials: state of the art polymeric material, nickel, and titanium alloy. The results are shown in Table 1 as normalized volumetric erosion rate values with the polymeric material as a baseline.

TABLE 1

|  | Polymeric | Ti Alloy (Ti—6Al—4V) | Nickel | Cermet (WC—12Co) |
| --- | --- | --- | --- | --- |
| 30 degree | 1.0 | 0.2 | 0.1 | 0 |
| 90 degree | 1.0 | 1.6 | 0.8 | 0.1 |

The results in Table 1 reflect an improvement in performance when compared to commonly used leading edge protection materials: baseline polymeric material, nickel, and titanium.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An airfoil blade comprising:
    an airfoil blade component body comprising a polymer matrix composite and a metal sheath covering the polymer matrix composite;
    a metallic erosion strip disposed on a leading edge of the airfoil blade component body and comprising opposite terminal strip portions proximate to the leading edge at opposite sides of the airfoil blade component body; and
    a cermet coating disposed on a leading edge surface of the strip, the cermet coating having a compressive residual stress of about 90-110 ksi and comprising opposite terminal coating portions that are respectively associated with the opposite terminal strip portions and respectively recessed toward the leading edge of the airfoil blade component from the opposite terminal strip portions.

2. The airfoil blade of claim 1, wherein the cermet is selected from the group consisting of tungsten-carbide-cobalt, tungsten-carbide-nickel, tungsten-carbide-cobalt-chrome, chrome-carbide-nickel-chrome, chrome-carbide-nickel, and combinations thereof.

3. The airfoil blade of claim 1, wherein the metallic erosion strip comprises nickel or titanium.

4. The airfoil blade of claim 1, wherein the strip has a uniform thickness and the cermet coating has an increasing thickness toward the leading edge of the airfoil blade component.

5. The airfoil blade of claim 1, wherein said cermet coating is disposed along substantially the entire leading edge of the airfoil blade.

6. The airfoil blade of claim 1, wherein the airfoil blade is a helicopter rotor blade.

7. The airfoil blade of claim 6, wherein said cermet coating is disposed on the surface of the strip on a leading edge portion of the airfoil blade closer to its axis of rotation than another leading edge portion of the airfoil blade.

* * * * *